US011527122B2

(12) United States Patent
Zomchek et al.

(10) Patent No.: US 11,527,122 B2
(45) Date of Patent: Dec. 13, 2022

(54) RADIO FREQUENCY IDENTIFIER APPARATUS FOR ACCESS CONTROL AND USER IDENTIFICATION

(71) Applicant: Rockwell Automation Technologies, Inc., Mayfield Heights, OH (US)

(72) Inventors: Kevin Zomchek, Nashua, NH (US); Yongyao Cai, Malden, MA (US); Rebecca R. Jaeger, Somerville, MA (US); Suresh R. Nair, Nashua, NH (US); Lee A. Lane, Medford, MA (US); Brian J. Taylor, Boston, MA (US); Burt Sacherski, Nashua, NH (US); Ashley M. Killian, Eastlake, OH (US); Michelle L. Poublon, Nashua, NH (US); Linxi Gao, Reading, MA (US); Timothy P. Wolfe, Medford, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/237,920

(22) Filed: Apr. 22, 2021

(65) Prior Publication Data

US 2022/0343709 A1 Oct. 27, 2022

(51) Int. Cl.
*G07C 9/22* (2020.01)
*G07C 9/28* (2020.01)
(Continued)

(52) U.S. Cl.
CPC ............ *G07C 9/22* (2020.01); *G05B 19/048* (2013.01); *G07C 9/00309* (2013.01); *G07C 9/10* (2020.01);
(Continued)

(58) Field of Classification Search
CPC ........ G07C 9/22; G07C 9/00309; G07C 9/10; G07C 9/28; G07C 2009/00793; G05B 19/048; G05B 2219/50177
(Continued)

(56) References Cited

U.S. PATENT DOCUMENTS 6,720,861 B1 * 4/2004 Rodenbeck ........ G07C 9/00817 340/542
6,720,874 B2 * 4/2004 Fufido ................. G08B 13/183 340/556

(Continued)

*Primary Examiner* — Nam V Nguyen
(74) *Attorney, Agent, or Firm* — Kunzler Bean & Adamson; Bruce R. Needham

(57) ABSTRACT

A component includes a housing mounted at an entry point of an enclosure protecting a machine. The component includes a first RFID sensor, in the housing, that reads a first RFID tag in close proximity to the first RFID sensor indicating a closed status of a movable barrier of the enclosure at the entry point. Opening of the movable barrier allows entry to the enclosure. The component includes a second RFID sensor, in the housing, that reads a second RFID tag of an authorized person. The component includes a barrier access module that sends an open alert that the movable barrier is in an open state in response to the first RFID sensor not being close enough to read the first RFID tag, and an identification module that sends tag information unique to a person from the second RFID tag.

16 Claims, 8 Drawing Sheets

(51) Int. Cl.
*G07C 9/10* (2020.01)
*G05B 19/048* (2006.01)
*G07C 9/00* (2020.01)

(52) U.S. Cl.
CPC ...... *G07C 9/28* (2020.01); *G05B 2219/50177* (2013.01); *G07C 2009/00793* (2013.01)

(58) Field of Classification Search
USPC .................................................. 340/5.72, 5.7
See application file for complete search history.

(56) References Cited

U.S. PATENT DOCUMENTS 7,557,712 B2 * 7/2009 Shelton .................... G07C 9/29 340/539.11
7,770,326 B2 * 8/2010 Al-Qassem ......... E05B 65/0014 49/31
7,916,018 B2 * 3/2011 Eskildsen ............ G08B 29/188 340/541
8,232,860 B2 * 7/2012 Goel ....................... G06F 21/83 340/10.2
8,334,792 B2 * 12/2012 Kim ......................... G08G 1/14 340/988
9,235,980 B2 * 1/2016 Sharma ................ G08B 25/008
9,286,741 B2 * 3/2016 Adolfsson ............. H04W 12/08
10,061,952 B2 * 8/2018 Duron ................ G06K 7/10425
10,235,822 B2 * 3/2019 Nye ....................... G05B 15/02
10,657,749 B2 * 5/2020 Nye ......................... G07C 9/37
10,706,703 B1 * 7/2020 Barr ....................... G08B 13/08
10,957,137 B2 * 3/2021 Baumgarte .............. G08B 7/06
2002/0067259 A1 * 6/2002 Fufidio .................... G07C 9/28 340/541
2007/0078782 A1 * 4/2007 Ono ................... G06Q 20/3674 705/67
2007/0268145 A1 * 11/2007 Bazakos .................. G07C 9/28 340/521
2009/0051528 A1 * 2/2009 Graichen ................. G07C 9/38 340/545.2
2010/0085214 A1 * 4/2010 Kim ......................... G08G 1/14 455/414.1
2020/0312073 A1 * 10/2020 Ivarson .................. H04N 7/188

* cited by examiner

RADIO FREQUENCY IDENTIFIER APPARATUS FOR ACCESS CONTROL AND USER IDENTIFICATION

BACKGROUND INFORMATION

The subject matter disclosed herein relates to radio frequency identification ("RFID") sensors used in a machine safety system and more specifically relates to a single housing with an RFID sensor for access control of an enclosure protecting personnel from a machine and a second RFID sensor in the housing for user identification.

BRIEF DESCRIPTION

A component for an RFID apparatus for access control and user identification is disclosed. A method and a system also perform the functions of the component. The component includes a housing mounted at an entry point of an enclosure. The enclosure limits access to a machine of an industrial operation. The component includes a first RFID sensor, located in the housing, configured to read a first RFID tag in close proximity to the first RFID sensor indicating a closed status of a movable barrier at the entry point. Opening of the movable barrier allows entry to the enclosure. The component includes a second RFID sensor, located in the housing, configured to read a second RFID tag of an authorized person, a barrier access module configured to send an open alert that the movable barrier is in an open state in response to the first RFID sensor not being close enough to read the first RFID tag, and an identification module configured to send tag information from the second RFID tag. The tag information is unique to the authorized person. At least a portion of the modules include hardware circuits, a programmable hardware device and program code. The program code stored on one or more non-transitory computer readable storage media.

A method for an RFID apparatus for access control and user identification includes reading, using a first RFID sensor, a first RFID tag in close proximity to the first RFID sensor indicating a closed status of a movable barrier at an entry point of an enclosure. The enclosure limits access to a machine of an industrial operation. Opening of the movable barrier allows entry to the enclosure and wherein the first RFID sensor is in a housing mounted at the entry point. The method includes reading, using a second RFID sensor located in the housing, a second RFID tag of an authorized person and sending an open alert that the movable barrier is in an open state in response to the first RFID sensor not being close enough to read the first RFID tag. The method includes sending tag information from the second RFID tag. The tag information is unique to the authorized person. The method includes sending a safety alert to the machine in response to the open alert.

A machine functional safety system includes a housing mounted at an entry point of an enclosure. The enclosure limits access to a machine of an industrial operation. The system includes a first RFID tag mounted on movable barrier at the entry point, where the movable barrier prevents entry to the enclosure when in a closed position. The system includes a first RFID sensor, located in the housing, configured to read the first RFID tag in close proximity to the first RFID sensor indicating a closed status of the movable barrier. The system includes a second RFID sensor, located in the housing, configured to read a second RFID tag of an authorized person and a barrier access module configured to send, to a safety relay, an open alert that the movable barrier is in an open state in response to the first RFID sensor not being close enough to read the first RFID tag. The safety relay transmits a safety alert to controller for the machine in response to receiving the open alert and the controller sends one or more commands to the machine in response to the safety alert. The system includes an identification module configured to send, to the safety relay, tag information from the second RFID tag. The tag information is unique to the authorized person and the safety relay transmits the tag information and/or an identity of the authorized person. At least a portion of the modules include hardware circuits, a programmable hardware device and/or program code. The program code is stored on one or more non-transitory computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
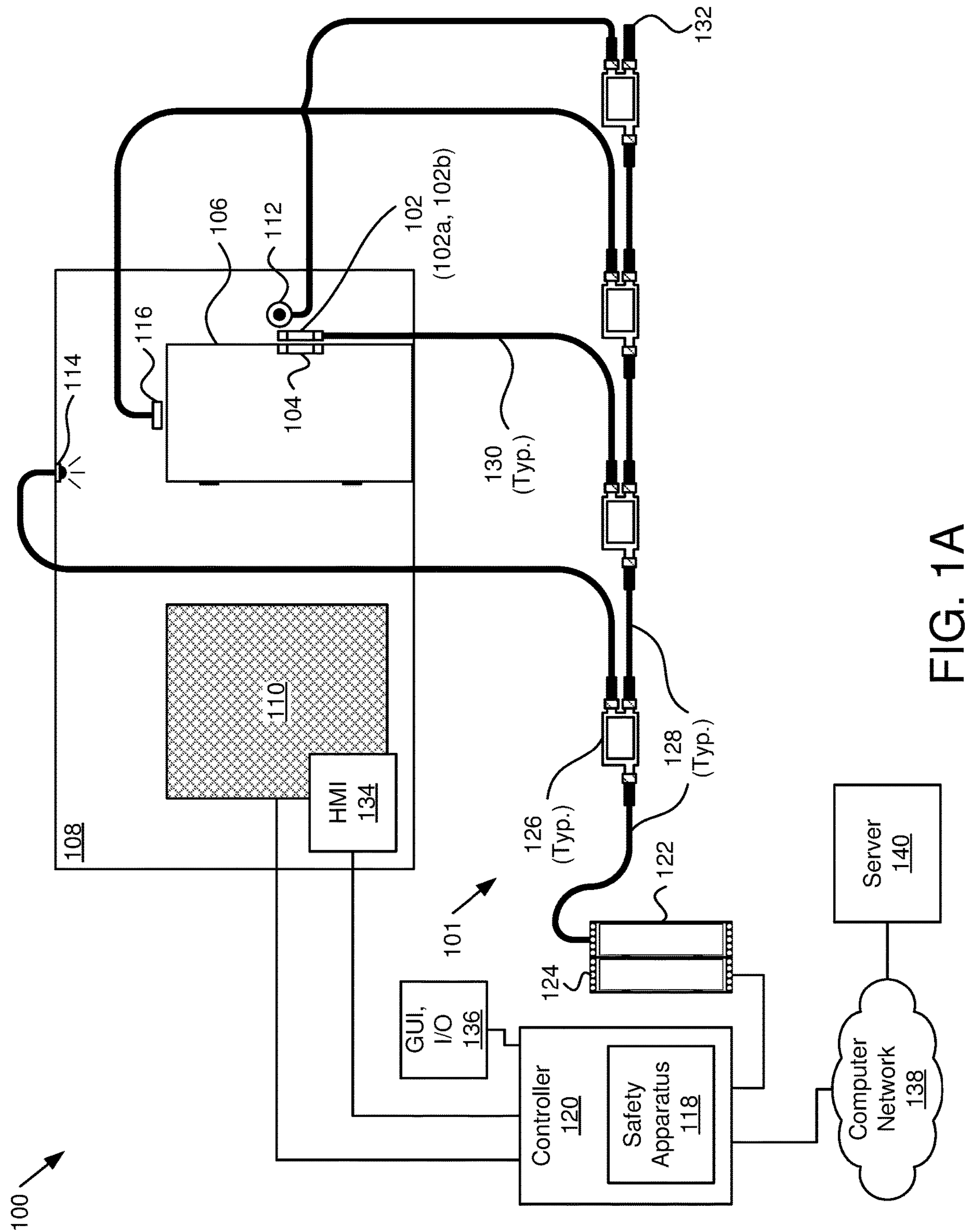
FIG. 1A is a schematic block diagram and front view illustrating an embodiment of a system with an RFID apparatus for access control and user identification.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise. The term “and/or” indicates embodiments of one or more of the listed elements, with “A and/or B” indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module,” or “system.” Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very-large scale integrated (“VLSI”) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof, A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A component for an RFID apparatus for access control and user identification is disclosed. A method and a system also perform the functions of the component. The component includes a housing mounted at an entry point of an enclosure. The enclosure limits access to a machine of an industrial operation. The component includes a first RFID sensor, located in the housing, configured to read a first RFID tag in close proximity to the first RFID sensor indicating a closed status of a movable barrier at the entry point. Opening of the movable barrier allows entry to the enclosure. The component includes a second RFID sensor, located in the housing, configured to read a second RFID tag of an authorized person, a barrier access module configured to send an open alert that the movable barrier is in an open state in response to the first RFID sensor not being close enough to read the first RFID tag, and an identification module configured to send tag information from the second RFID tag. The tag information is unique to the authorized person. At least a portion of the modules include hardware circuits, a programmable hardware device and program code. The program code stored on one or more non-transitory computer readable storage media.

In some embodiments, the component includes a machine alert module configured to send a safety alert to the machine in response to the open alert. In other embodiments, the component includes a machine safety module configured to send a first safety instruction to the machine in response to, within an entry window of time, receiving the open alert, receiving the tag information and confirming that the tag information belongs to an authorized person currently authorized to enter the enclosure, and to send a second safety instruction in response to, within the entry window of time, receiving the open alert and without receiving tag information or confirming that the tag information belongs to an authorized person currently authorized to enter the enclosure. The first safety instruction differs from the second safety instruction.

In a further embodiment, the first safety instruction commands the machine according to an authorized person within the enclosure protocol and the second safety instruction commands the machine according to an unauthorized person within the enclosure protocol, where the authorized person within the enclosure protocol is less restrictive than the unauthorized person within the enclosure protocol in terms of actions to prevent injury. In another further embodiment, the component includes a motion sensor configured to sense movement within the enclosure indicative of one or more people within the enclosure. The machine safety module sends a third safety instruction to the machine in response to the first safety instruction and the sensed movement in the enclosure, where the third safety instruction is according to an authorized person within the enclosure protocol, and sends a fourth safety instruction to the machine in response to the second safety instruction and the sensed movement in the enclosure. The fourth safety instruction is according to an unauthorized person within the enclosure protocol.

In other embodiments, in response to the motion sensor detecting more people within the enclosure than a number of authorized people for which tag information is received and for which the tag information is confirmed to belong to an authorized person currently authorized to be within the enclosure, the machine safety module sends the fourth safety instruction to the machine. In other embodiments, the third safety instruction and the fourth safety instruction include one or more commands responsive to the motion sensor detecting movement, position and speed indicative of a person moving toward and reaching the machine. The one or more commands include action to prevent injury of a person in the enclosure. In other embodiments, the motion sensor includes a three-dimensional motion sensor positioned to detect position, direction of travel and speed of personnel in the enclosure. In other embodiments, the component includes an exit module configured to, in response to the motion sensor determining people within the enclosure have left the enclosure, send a notification that the enclosure does not have people in the enclosure.

In some embodiments, the component includes an identity module configured to determine the identity of a person associated with the tag information and sending the identity of the person associated with the tag information. In other embodiments, the component includes an unlocking module configured to unlock the movable barrier in response to confirming that the tag information belongs to an authorized person currently authorized to enter the enclosure. In other embodiments, the component includes a third RFID sensor positioned to detect the second RFID tag approaching the movable barrier from the enclosure.

A method for an RFID apparatus for access control and user identification includes reading, using a first RFID sensor, a first RFID tag in close proximity to the first RFID sensor indicating a closed status of a movable barrier at an entry point of an enclosure. The enclosure limits access to a machine of an industrial operation. Opening of the movable barrier allows entry to the enclosure and wherein the first RFID sensor is in a housing mounted at the entry point. The method includes reading, using a second RFID sensor located in the housing, a second RFID tag of an authorized person and sending an open alert that the movable barrier is in an open state in response to the first RFID sensor not being close enough to read the first RFID tag. The method includes sending tag information from the second RFID tag. The tag information is unique to the authorized person. The method includes sending a safety alert to the machine in response to the open alert.

In some embodiments, the method includes determining the identity of a person associated with the tag information and sending the identity of the person associated with the tag information. In other embodiments, the method includes unlocking the movable barrier in response to confirming that the tag information belongs to an authorized person currently authorized to enter the enclosure. In other embodiments, the method includes sending a first safety instruction to the machine in response to, within an entry window of time, receiving the open alert, receiving the tag information and confirming that the tag information belongs to an authorized person currently authorized to enter the enclosure, and sending a second safety instruction in response to, within the entry window of time, receiving the open alert and without receiving tag information or confirming that the tag information belongs to an authorized person currently authorized to enter the enclosure. The first safety instruction commands the machine according to an authorized person within the enclosure protocol and the second safety instruction commands the machine according to an unauthorized person within the enclosure protocol. The authorized person within the enclosure protocol is less restrictive than the unauthorized person within the enclosure protocol in terms of actions to prevent injury.

In some embodiments, the method includes sensing, using a motion sensor, movement within the enclosure indicative of one or more people in the enclosure, sending a third safety instruction to the machine in response to the first safety instruction and the sensed movement in the enclosure, where the third safety instruction is according to an authorized person within the enclosure protocol, and sending a fourth safety instruction to the machine in response to the second safety instruction and the sensed movement in the enclosure. The fourth safety instruction is according to an unauthorized person within the enclosure protocol. In other embodiments, the method includes, in response to the motion sensor determining people within the enclosure have left the enclosure, sending a notification that the enclosure does not have people in the enclosure.

A machine functional safety system includes a housing mounted at an entry point of an enclosure. The enclosure limits access to a machine of an industrial operation. The system includes a first RFID tag mounted on movable barrier at the entry point, where the movable barrier prevents entry to the enclosure when in a closed position. The system includes a first RFID sensor, located in the housing, configured to read the first RFID tag in close proximity to the first RFID sensor indicating a closed status of the movable barrier. The system includes a second RFID sensor, located in the housing, configured to read a second RFID tag of an identification of an authorized person and a barrier access module configured to send, to a safety relay, an open alert that the movable barrier is in an open state in response to the first RFID sensor not being close enough to read the first RFID tag. The safety relay transmits a safety alert to controller for the machine in response to receiving the open alert and the controller sends one or more commands to the machine in response to the safety alert. The system includes an identification module configured to send, to the safety relay, tag information from the second RFID tag. The tag information is unique to the authorized person and the safety relay transmits the tag information and/or an identity of the authorized person. At least a portion of the modules include hardware circuits, a programmable hardware device and/or program code. The program code is stored on one or more non-transitory computer readable storage media.

In some embodiments, the system includes a machine safety module configured to send a first safety instruction to the machine in response to, within an entry window of time, receiving the open alert, receiving the tag information and confirming that the tag information belongs to an authorized person currently authorized to enter the enclosure, and send a second safety instruction in response to, within the entry window of time, receiving the open alert and without receiving tag information or confirming that the tag information belongs to an authorized person currently authorized to enter the enclosure. The first safety instruction differs from the second safety instruction.

Figure 1B:
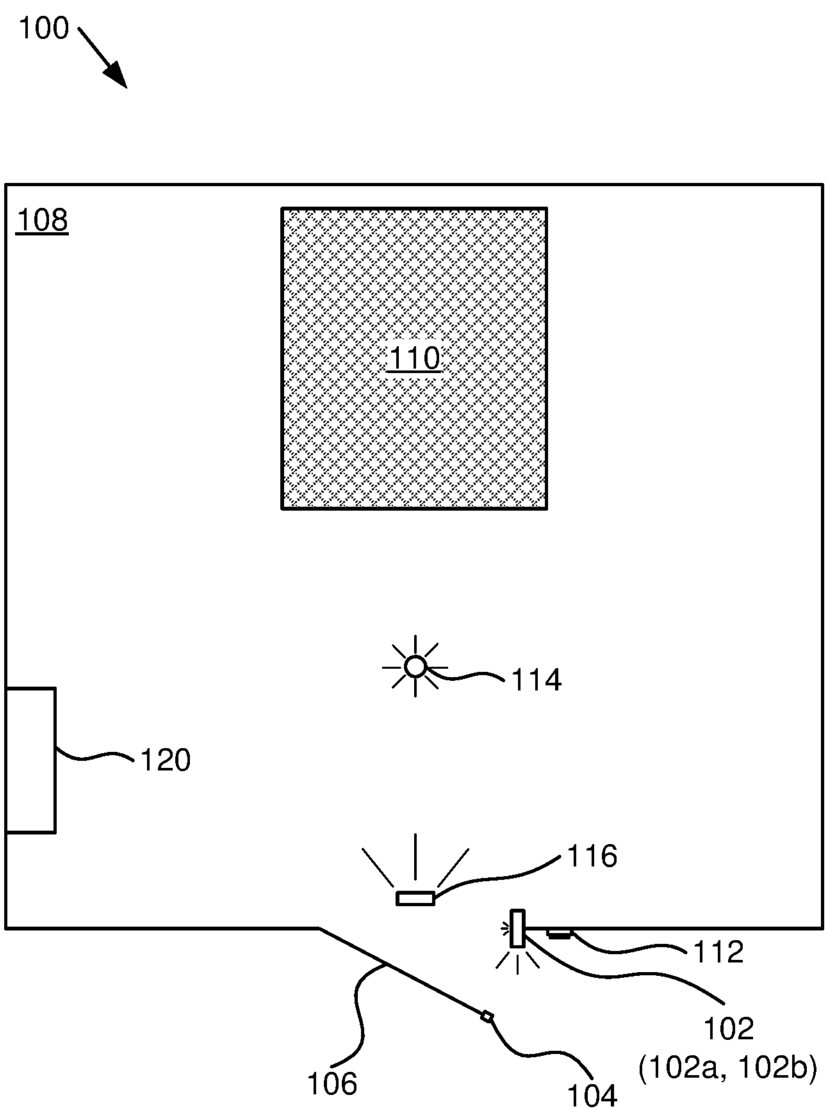
FIG. 1B is a schematic block diagram illustrating a top view of the embodiment of the system of FIG. 1A.

FIG. 1A is a schematic block diagram and front view illustrating an embodiment of a system 100 with a radio frequency identifier ("RFID") apparatus for access control and user identification. FIG. 1B is a schematic block diagram illustrating a top view of the embodiment of the system 100 of FIG. 1A. The system 100 includes a housing 102 with RFID sensors, a first RFID tag 104, a movable barrier 106, an enclosure 108 with a machine 110, an access device 112, a motion sensor 114, a third RFID sensor 116, a safety apparatus 118, a controller 120, a safety relay 122, a network interface 124, connection taps 126, trunk line conductors 128, tap conductors 130, a terminator 132, a human-machine interface ("HMI") 134, a graphical user interface and input/output devices 136, a computer network 138 and a server 140, which are described below.

The system 100 includes a housing 102 that includes both a first RFID sensor 102*a* used to determine if a movable barrier 106 is open or closed and a second RFID sensor 102*b* for user identification. The dual purpose housing 102 is useful so that functionality of a typical RFID sensor used for access can be combined with user identification using RFID technology. Combining both functions into a single housing provides distinct advantage over existing technology that separates these functions into multiple devices that are required to communicate over wires to a controller and/or to each other.

The first RFID sensor 102*a* is used in conjunction with a first RFID tag 104 mounted on a movable barrier 106 so that when the movable barrier 106 is closed, the first RFID tag 104 is located close enough to the first RFID sensor 102*a* to read the first RFID tag 104 indicating that the movable barrier 106 is closed. In some embodiments, the housing 102, first RFID sensor 102*a*, and the second RFID sensor 102*b* are part of a non-contact switch that does not include a locking mechanism. In these embodiments, the movable barrier 106 may be locked by a separate locking mechanism or may not have a lock. In other embodiments, the housing 102, first RFID sensor 102*a*, and the second RFID sensor 102*b* are part of a locking device used to lock the movable barrier 106, such as a locking switch.

The first RFID sensor 102*a* is configured to read a first RFID tag 104 that is in very close proximity to the first RFID sensor 102*a*. In some examples, the first RFID sensor 102*a* reads the first RFID tag 104 with the first RFID tag 104 is within about 1-2 centimeters ("cm"). Other first RFID sensors 102*a* have sensing ranges that are a little longer or shorter and may have a customizable range. For example, the first RFID sensor 102*a* may transmit using a frequency in the range of 125 kilohertz ("kHz"), which is used for short range RFID sensing. In other embodiments, the first RFID sensor 102*a* transmits in the range of about 100-200 kHz. In other embodiments, the first RFID sensor 102*a* transmits using a higher frequency, such as around 13 megahertz ("MHz") to about 900 MHz, which has a range that is longer. The first RFID sensor 102*a* range can then be adjusted as desired. Having a short range, such as in the 1-2 cm range is short enough that the first RFID tag 104 is close enough for the movable barrier 106 to be considered closed when read. In other embodiments, the range for the first RFID sensor 102*a* may be in a range of 0.25-3 cm. One of skill in the art will recognize other ranges for the first RFID sensor 102*a* and ranges for a frequency of transmission.

The second RFID sensor 102*b* is configured to read a second RFID tag an authorized person. For example, the second RFID tag may be in an identification, a badge, a card, etc. of the authorized person. The second RFID sensor 102*b*, in some embodiments, has a longer range than the first RFID sensor 102*a*. For example, the second RFID sensor 102*b* may have a range that would allow an authorized person to present a badge, identification, card, etc. with the second RFID sensor 102*b* in a range of about 1-4 cm. In other embodiments, the range of the second RFID sensor 102*b* is even longer, such as in the 5-20 cm range. In other embodiments, the second RFID sensor 102*b* has a range sufficient for an authorized person with the second RFID tag to be within 1-2 meters from the second RFID sensor 102*b*. In some embodiments, the second RFID sensor 102*b* is directional. For example, the second RFID sensor 102*b* may be directed to an area just outside the enclosure 108. In other embodiments, the second RFID sensor 102*b* transmits a frequency in all directions. One of skill in the art will recognize other ways for the second RFID sensor 102*b* to transmit a signal and other appropriate ranges.

The enclosure 108 provides access to at least one machine 110 of an industrial operation. The enclosure 108 includes a movable barrier 106 at an entry point to the enclosure 108. The movable barrier 106 may be a swinging gate, a sliding gate, an access door or any other movable barrier 106 that is able to restrict access to the enclosure 108 or to open access to the enclosure 108. The enclosure 108 may include a fence, walls, a metal housing of the machine 110 or other barrier to access to the machine 110.

The machine 110 is any part of an industrial operation protected from access by unauthorized people. For example, the machine 110 may have some dangerous elements and the enclosure 108 is meant for safety. In other embodiments, the enclosure 108 is meant to prevent unauthorized access for security reasons or for security reasons as well as safety. In some embodiments, the housing 102 with the first and second RFID sensors 102*a*, 102*b* is used to know who is accessing the machine 110. One of skill in the art will recognize other reasons to have an enclosure 108 around a machine 110.

The system 100, in some embodiments, includes an access device 112, which provides a way to open the movable barrier 106 when this functionality is not included in the housing 102. For example, when the housing 102 does not include a locking mechanism, the access device 112 provides a button, keyed lock or other way for an authorized person to unlock the movable barrier 106. In other embodiments, the movable barrier 106 does not include a lock and the system 100 does not include the access device 112. In other embodiments, the housing 102 and RFID sensors 102*a*, 102*b* are part of a locking mechanism and a separate access device 112 is not included.

The system 100 includes, in some embodiments, a motion sensor 114 that detects motion within the enclosure. In the embodiments, the system 100 monitors motion within the enclosure 108 and uses motion in addition to information from the first and second RFID sensors 102*a*, 102*b* to determine if a person is within the enclosure 108. For example, the motion sensor 114 may be infrared, ultrasonic, a combination of both or are of a different technology. In some embodiments, enclosure 108 blocks motion outside of the enclosure 108 so the motion sensor 114 senses motion in the enclosure 108. In other embodiments, the motion sensor is a three-dimensional motion sensor that tracks position, movement and direction of movement and can distinguish motion within the enclosure 108 from motion outside of the enclosure 108.

The system 100 includes, in some embodiments, a third RFID sensor 116 positioned to detect the second RFID tag leaving the enclosure 108. In some examples, the third RFID sensor 116 is directional and is pointed toward the interior of the enclosure 108. In some embodiments, the third RFID sensor 116 is mounted above the movable barrier 106 and is pointed such that the second RFID tag with the authorized person exiting the enclosure 108 is read by the third RFID sensor 116. In other embodiments, the third RFID sensor 116 is mounted by the housing 102 such that an authorized person leaving the enclosure 108 is able to present the second RFID tag to the third RFID sensor 116. In some embodiments, the third RFID sensor 116 is mounted in the housing 102. In some embodiments, the second RFID sensor 102*b* senses when the second RFID tag is close enough to be read by the second RFID sensor 102*b* while the authorized person is leaving the enclosure 108.

The system 100, in some embodiments, includes a safety apparatus 118 that communicates with the first and second RFID sensors 102*a*, 102*b* and manages signals to the machine 110 in response to input from the first and second RFID sensors 102*a*, 102*b* and input from the third RFID sensor 116, the motion sensor 114 and the access device 112, when included in the system 100. In some embodiments, the safety apparatus 118 issues commands to the machine 110 directly or indirectly. In other embodiments, the safety apparatus 118 sends signals to the controller 120 and the controller 120 sends commands to the machine 110 directly or indirectly. For example, the machine 110 may include a drive and the safety apparatus 118 and/or controller 120 may send commands to the drive, which then controls the machine 110. In some embodiments, the safety apparatus 118 is located elsewhere, such as in the server 140 or other computing device.

The safety apparatus 118, in some embodiments, is implemented in program code and executes on a processor of the controller 120 or other computing device where the safety apparatus 118. In some embodiments, the safety apparatus 118 is implemented with a programmable hardware device, such a field programmable gate array ("FPGA"), programmable array logic, etc. In other embodiments, the safety apparatus 118 is implemented with at least some hardware circuits.

In depicted embodiment, the first and second RFID sensors 102*a*, 102*b* and other devices communicate with the safety apparatus 118 using a conditions monitoring system or machine safety system 101. In some embodiments, the machine safety system 101 includes a network interface 124 connected to a safety relay 122. The network interface 124 provides a network connection to the controller 120. For example, the machine safety system 101 may include one internet protocol ("IP") address and may be able to provide information from safety devices through the single IP address to the controller 120. Such an arrangement beneficially reduces the number of IP addresses for a plant that includes the machine 110. Other networking interfaces 124 may include more than one IP address, for example, for multiple safety relays 122 or multiple lines from a safety relay 122. A safety device may include a non-contact switch, such as the housing 102 and RFID sensors 102*a*, 102*b*, a light curtain, a locking switch (the housing 102 and RFID sensors 102*a*, 102*b* may be embodied as a locking switch), an emergency stop, an actuator, a cable pull switch, a key interlock switch, and the like. In other embodiments, one or more safety devices include an IP address. In other embodiments, the safety devices run on a proprietary network different than an IP network.

In the embodiment depicted in FIG. 1, the machine safety system 101 includes trunk line conductors 128 running between connection taps 126. At each connection tap 126, a tap conductor 130 runs to a safety device, such as the housing 102 (which may be a non-contact switch, locking switch or the like), the third RFID sensor 116, the motion sensor 114, a light curtain, a locking switch, an emergency stop, a cable pull switch, etc. In one embodiment, the machine safety system 101 includes a GuardLink® system by Rockwell Automation® or similar machine safety system by another vendor. A safety relay 122 in a GuardLink system, in some embodiments, has capacity for multiple lines where each line can have up to 32 safety devices. In other embodiments, a safety relay 122 in a GuardLink system has capacity for more lines and more safety devices. Other machine safety system 101 may include multiple safety relays 122, an input/output device, etc. which would increase a capacity of the machine safety system 101 to include more safety devices. A GuardLink system has an ability to daisy chain between connection taps 126 without having to loop the trunk line conductor 128 in a loop while meeting applicable safety standards, such being EN/ISO 13849-1 performance level "e" ("PLe") certified by TÜVRheinland® or other applicable certification. Other machine safety systems 101 may include a safety apparatus 118 and include other features and benefits.

In some embodiments, components of the system 100, such as the housing 102 and RFID sensors 102*a*, 102*b*, the access device 112, the motion sensor 114 and/or third RFID sensor 116 are connected to the safety apparatus 118 through a different system. The machine safety system 101 may connect some components of the system 100 while other components are connected through another system or are connected directly to the safety apparatus 118/controller 120.

In the system 100 of FIG. 1, where the housing 102 is a non-contact switch, the non-contact switch is on a frame of the movable barrier 106 and is used to monitor when the movable barrier 106 is open. The movable barrier 106 is depicted with two hinges on a left side and the non-contact switch on the right side of the movable barrier 106 where the movable barrier 106 opens. In some embodiments, the machine safety system 101 may send an alert when the non-contact switch senses that the movable barrier 106 is open, which may trigger shutdown of the machine 110 or other action. Other machine safety systems 101 include other safety devices. The terminator 132 is placed on a terminal of the last connection tap 126 to indicate to the controller 120 that there are no more devices on the trunk line conductors 128 and to let the last connection tap 126 know that this connection tap 126 with the terminator 132 is the last device on the trunk line conductors 128.

In the system 100 of FIG. 1, the controller 120 is connected to a server 140 over a computer network 138. The controller 120 may communicate with the server 140 for various purposes. For example, the server 140 may control at least some aspects of the machine 110. For example, the server 140 may be in contact with one or more motor controllers of the machine 110 and may control starting and stopping of the machine 110. In other embodiments, the controller 120 controls the machine 110 and the server 140 may allow remote access. One of skill in the art will recognize other purposes for the server 140 and configurations to communicate with and control the machine 110.

In some embodiments, the controller 120 is connected to or includes a graphical user interface ("GUI") and input/output devices 136 that allow a user to interact with the safety apparatus 118 of the controller 120 to enter and view information. For example, the GUI and input/output devices 136 may be an electronic display, keyboard, mouse, etc. In other embodiments, a user may interact with the safety apparatus 118 via the HMI 134 and/or the server 140.

Figure 2:
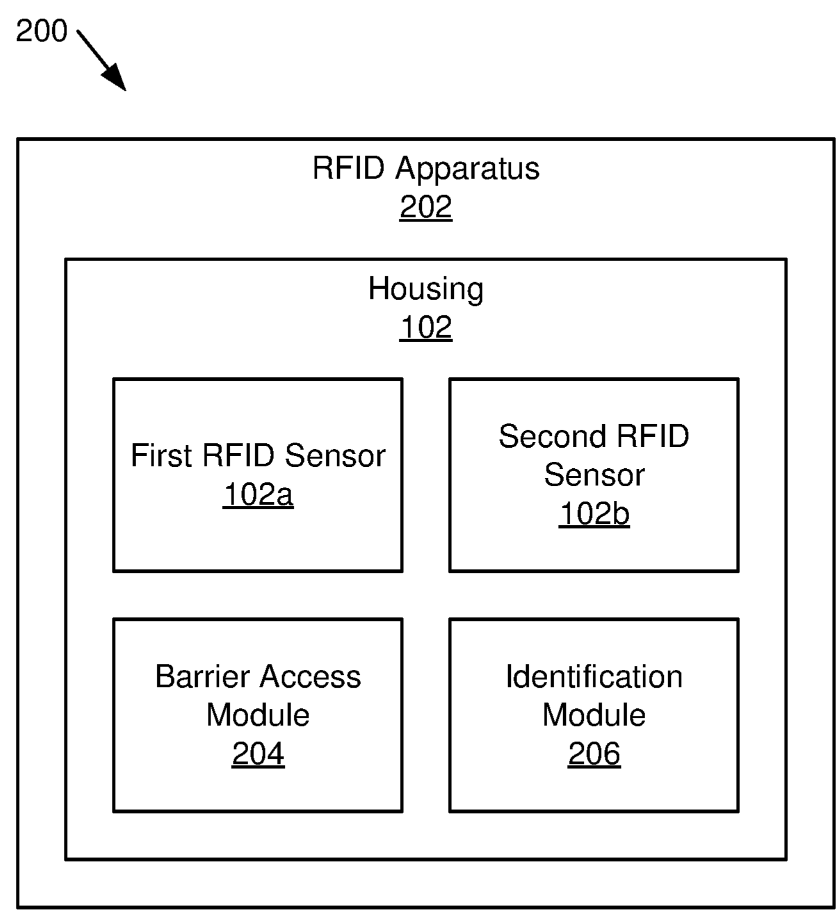
FIG. 2 is a schematic block diagram illustrating one embodiment of an RFID apparatus for access control and user identification.

FIG. 2 is a schematic block diagram illustrating one embodiment 200 of an RFID apparatus 202 for access control and user identification. The RFID apparatus 200 includes a housing 102 with the first RFID sensor 102*a*, the second RFID sensor 102*b*, a barrier access module 204 and an identification module 206, which are explained below.

The RFID apparatus 202 includes the housing 102 with the first and second RFID sensors 102*a*, 102*b*, which are substantially similar to those described above in relation to the system 100 of FIGS. 1A and 1B. The housing 102 is mounted at an entry point of the enclosure 108. The enclosure 108 limits access to the machine 110 of an industrial operation. The first RFID sensor 102*a* is located in the housing 102 and is configured to read the first RFID tag 104 in close proximity to the first RFID sensor 102*a* indicating a closed status of the movable barrier 106 at the entry point. Opening of the movable barrier 106 allows entry to the enclosure 108. The second RFID sensor 102*b* is also located in the housing 102 and is configured to read a second RFID tag of an identification of an authorized person.

The RFID apparatus 202 includes a barrier access module 204 configured to send an open alert that the movable barrier 106 is in an open state in response to the first RFID sensor 102*a* not being close enough to read the first RFID tag 104. The open alert, in some embodiments, includes an analog signal, such as a voltage swing from positive to negative or vice-versa. In other embodiments, the open alert is a digital signal and the barrier access module 204 sends a particular digital message when the movable barrier 106 is open or closed. The digital message may be a single message or may be a digital message sent multiple times.

The RFID apparatus 202 includes an identification module 206 configured to send tag information from the second RFID tag where the tag information is unique to the authorized person. In some embodiments, the identification module 206 sends the tag information through the machine safety system 101 to another location, such as the server 140, to the safety apparatus 118 or elsewhere. In another embodiment, the identification module 206 sends the tag information to another module or device in the housing 102 for processing, as described in more detail below. In some embodiments, the tag information sent from the identification module 206 is a coded signal that includes information from the second RFID tag. In other embodiments, the identification module 206 decodes information from the second RFID tag and identifies an authorized person corresponding to the second RFID tag. One of skill in the art will recognize other ways for the identification module 206 and the barrier access module 204 to interact with other components outside the housing.

In some embodiments, the identification module 206 and the barrier access module 204 are implemented at least partially with hardware circuits and may be implemented with an application specific integrated circuit ("ASIC"), etc. In other embodiments, the identification module 206 and the barrier access module 204 are implemented at least partially with program code and the housing 102 includes a processor. In other embodiments, the identification module 206 and the barrier access module 204 are implemented with a programmable hardware device, such as an FPGA. In other embodiments, the identification module 206 and the barrier access module 204 are implemented with a combination of hardware circuits, a programmable hardware device, and program code. Beneficially, the RFID apparatus 202 of FIG. 2 provides a single device that can be used to determine if a movable barrier 106 is closed or not and can also be used to read a second RFID tag of an authorized person.

Figure 3:
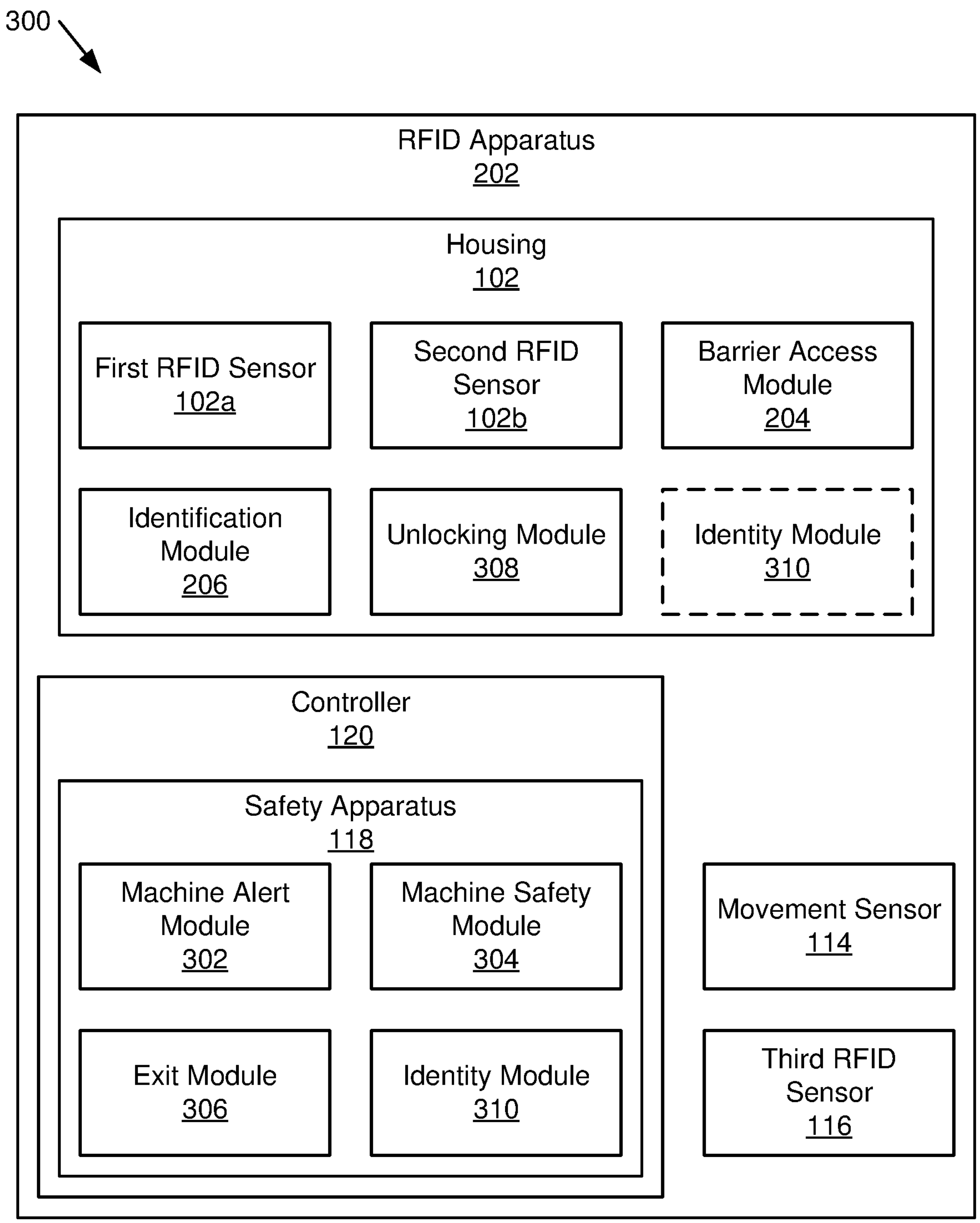
FIG. 3 is a schematic block diagram illustrating another embodiment of an RFID apparatus for access control and user identification.

FIG. 3 is a schematic block diagram illustrating another embodiment 300 of an RFID apparatus 202 for access control and user identification. The RFID apparatus 202 includes a housing 102 with the first RFID sensor 102*a*, the second RFID sensor 102*b*, a barrier access module 204 and an identification module 206, the motion sensor 114 and the third RFID sensor 116, which are substantially similar to those described above in relation to the RFID apparatus 202 of FIG. 2 and the system 100 of FIG. 1. In various embodiments, the RFID apparatus 202 includes one or more of a controller 120 with a safety apparatus 118 that includes a machine alert module 302, a machine safety module 304, an exit module 306 and an identity module 310 and the housing 102 includes an unlocking module 308 and an identity module 310, which are described below.

In some embodiments, the safety apparatus 118 includes a machine alert module 302 configured to send a safety alert to the machine 110 in response to the open alert. For example, the safety alert may cause some action in the machine 110, such as stopping or slowing the machine 110 due to the open alert. The safety alert, in some embodiments, is used by the controller 120 or other device that controls the machine 110 to take some action based on the open alert.

In some embodiments, the safety apparatus 118 includes a machine safety module 304 configured to send a first safety instruction to the machine 110 in response to, within an entry window of time, receiving the open alert, receiving the tag information and confirming that the tag information belongs to an authorized person currently authorized to enter the enclosure 108. The machine safety module 304 is also configured to send a second safety instruction in response to, within the entry window of time, receiving the open alert and without receiving tag information or confirming that the tag information belongs to an authorized person currently authorized to enter the enclosure 108. The first safety instruction differs from the second safety instruction. The machine safety module 304 receives the tag information based on information read from the second RFID tag.

The window of time is a time limit for the second RFID sensor 102*b* to read the second tag and verify that the tag information belongs to an authorized person currently authorized to enter the enclosure 108 within a reasonable amount of time from receiving an open alert. For example, the window of time may be 10 seconds. In other embodiments, the window of time may be in the range of 1 second to 30 seconds. If the machine safety module 304 does not receive an open alert but receives tag information from the second RFID sensor 102*b* and/or verifies that the tag information belongs to an authorized person, the machine safety module 304, in some embodiments, would not send the first safety instruction because the movable barrier 106 was not opened. In some embodiments, if the window of time passes without either receiving the tag information or confirming that the tag information belongs to an authorized person, the machine safety module 304 concludes that an unauthorized person has opened the movable barrier 106 and entered the enclosure 108.

In some embodiments, the first safety instruction commands the machine 110 according to an "authorized person within the enclosure" protocol and the second safety instruction commands the machine according to an "unauthorized person within the enclosure" protocol. For example, the authorized person within the enclosure protocol is less restrictive than the unauthorized person within the enclosure protocol in terms of actions to prevent injury. In the embodiment, an authorized person is presumed to know how to act safely within the enclosure 108, which allows more freedom to keep the machine 110 or parts of the machine 110 operating.

For example, the first safety instruction may be to keep the machine 110 running while counting on the authorized person knowing how to safely approach the machine 110. In other embodiments, the first safety instruction may reduce the speed of the machine 110, may stop certain parts of the machine 110 or other action suitable for an authorized person to be present at the movable barrier 106 of the enclosure 108. The first safety instruction, in some embodiments, assumes that the authorized person will enter the enclosure 108 or reach into the enclosure 108.

The second safety instruction is based on the idea that an unauthorized person would not be properly trained about how to safely enter or reach into the enclosure 108. When the movable barrier 106 opens and the barrier access module 204 sends an open alert and then the second RFID sensor 102*b* does not receive any tag information corresponding to an authorized person, an assumption is made that an unauthorized person is entering the enclosure 108. Thus, the second safety instruction is more restrictive than the first safety instruction in terms of taking action to protect a person in the enclosure 108. In other embodiments, the first and second safety instructions are identical where the machine 110 is dangerous to all while operating.

In some embodiments, the RFID apparatus 202 includes the motion sensor 114 configured to identify that one or more people are within the enclosure 108. In the embodiments, movement information from the motion sensor 114 supplements information from the first and second RFID sensors 102*a*, 102*b*. In some embodiments, the movement information simply identifies movement within the enclosure 108. In other embodiments, movement information from the motion sensor 114 includes information to identify a position, a direction of travel and a speed of travel of one or more people within the enclosure 108. For example, the motion sensor 114 may be a three-dimensional ("3D") motion sensor. In the embodiments, movement information from the motion sensor 114 is analyzed for movement, speed, etc. toward the machine 110, which would be treated differently from other movement information, such as movement away from the machine 110, movement parallel to the machine 110, etc.

In the embodiments, the machine safety module 304 sends a third safety instruction to the machine 110 in response to the first safety instruction and the sensed movement in the enclosure 108. The third safety instruction is according to an "authorized person within the enclosure" protocol. In the embodiment, the machine safety module 304 recognizes from the first safety instruction that there is an open alert and that tag information was received belonging to an authorized person that is authorized to be within the enclosure 108. Thus movement sensed by the motion sensor 114 is presumed to be that of an authorized person so the third safety instruction is based on an authorized person being near the machine 110. In some embodiments, the machine safety module 304 sends the third instruction to the machine 110 or other equipment that controls the machine 110.

In the embodiments, the machine safety module 304 sends a fourth safety instruction to the machine 110 in response to the second safety instruction and the sensed movement in the enclosure 108. The fourth safety instruction is according to an "unauthorized person within the enclosure" protocol. The machine safety module 304 recognizes that the second safety instruction means that while there is an open alert that the movable barrier 106 has been opened, there has not been any tag information read from a second RFID tag or that the tag information does not belong to an authorized person. Thus, after the second safety instruction and sensed movement of a person within the enclosure 108 by the motion sensor 114, the machine safety module 304 concludes that an unauthorized person is within the enclosure 108. The fourth safety instruction is transmitted to the machine 110 or other equipment controlling the machine 110 and is used to take more restrictive steps to protect the person within the enclosure 108 than the third safety instruction.

In some embodiments, the machine safety module 304 may determine from information from the first and second RFID sensors 102*a*, 102*b* that an authorized person is at the movable barrier 106 and/or entering the enclosure 108 and the third safety instruction provides instruction to control the machine 110 based on the assumption that an authorized person is in the enclosure 108. Where the motion sensor 114 is a typical motion sensor, the machine safety module 304 may send the third safety instruction after the first safety instruction and in response to motion detected by the motion sensor 114. Where the motion sensor 114 is a 3D motion sensor, the machine safety module 304 may send the third safety instruction in response to the first safety instruction identifying the person entering or reaching in the enclosure 108 as an authorized person and in response to movement toward the machine 110.

In some embodiments, in response to the motion sensor 114 detecting more people within the enclosure than a number of authorized people for which tag information is received and for which the tag information is confirmed to belong to an authorized person currently authorized to be within the enclosure 108, the machine safety module 304 sends the fourth safety instruction to the machine 110. In some embodiments, an unauthorized person may enter the enclosure with an authorized person so the machine safety module 304 sends the fourth safety instruction, which is used by the machine 110 or equipment controlling the machine 110 to take action more restrictive than the third safety instruction. In some embodiments, the identification module 206 receives tag information from two or more second RFID tags indicative of two or more people wanting to enter the enclosure 108.

In some embodiments, the third safety instruction and the fourth safety instruction include one or more commands responsive to the motion sensor 114 detecting movement, position and speed indicative of a person moving toward and reaching the machine 110. The one or more commands control the machine 110 and the one or more commands include action to prevent injury of a person in the enclosure 108.

In some embodiments, the safety apparatus 118 includes an exit module 306 configured to, in response to the motion sensor 114 determining people within the enclosure 108 have left the enclosure 108, send a notification that the enclosure 108 does not have people in the enclosure 108. The notification that the enclosure 108 does not have people, in some embodiments, causes the machine 110 to resume normal operation. For example, the normal operation includes the machine 110 running at an intended speed instead of a reduced speed or being stopped. In some embodiments, the exit module 306, in response to the motion sensor 114 determining people within the enclosure 108 have left the enclosure 108 and/or an authorized person presenting a second RFID tag to the housing 102 or being sensed by the third RFID sensor 116, sends a notification that the enclosure 108 does not have people in the enclosure 108.

In some embodiments, the RFID apparatus 202 includes an unlocking module 308 configured to unlock the movable barrier 106 in response to confirming that the tag information belongs to an authorized person currently authorized to enter the enclosure 108. In some embodiments, the housing 102 and first and second sensors **102*a*, 102*b* are part of a locking switch that locks the movable barrier 106 and the unlocking module 308 unlocks the locking switch permitting opening of the movable barrier 106. In other embodiments, the enclosure 108 includes a separate locking mechanism or locking switch that locks the movable barrier 106. In some embodiments, the access device 112 is part of or tied to the separate locking mechanism. In embodiments with the unlocking module 308, the unlocking module 308 maintains the locking mechanism in a locked state and unlocks the movable barrier 106 in response to confirming that the tag information belongs to an authorized person currently authorized to enter the enclosure 108**.

While the unlocking module 308 is depicted in FIG. 3 as being in the housing 102, in other embodiments, the unlocking module 308 is located elsewhere, such as in the safety apparatus 118. The modules 204, 206, 302, 304, 306, 308, 310 are depicted split between the housing 102 and safety apparatus 118, but in other embodiments, the 204, 206, 302, 304, 306, 308, 310 may be located elsewhere.

In some embodiments, the safety apparatus 118 includes an identity module 310 configured to determine the identity of a person associated with the tag information and sending the identity of the person associated with the tag information. For example, the machine safety module 304 may rely on the identity module 310 determining the identity of a person to determine if the person is authorized to be within the enclosure 108. In some embodiments, the identity module 310 determines if the identified person is authorized to be within the enclosure 108. In some embodiments, the identity module 310 resides in the housing 102. In other embodiments, the identity module 310 includes access to a database that correlates tag information from a second RFID tag with a particular person. In another embodiment, the database also includes whether or not a person is authorized to be within the enclosure 108. In other embodiments, a person being correlated to tag information constitutes authorization to be within the enclosure 108.

Figure 4:
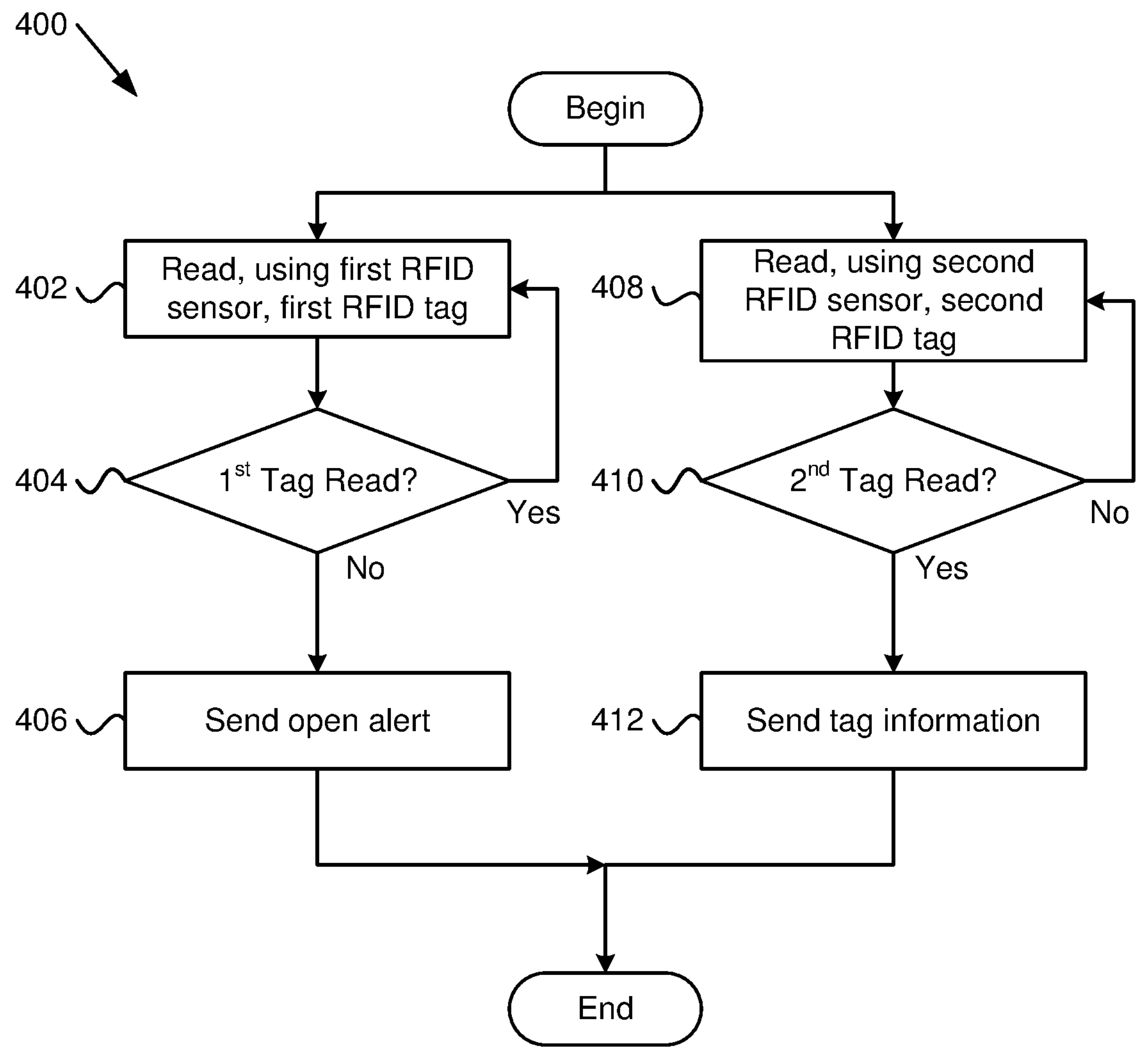
FIG. 4 is a schematic flowchart diagram illustrating one embodiment of a method for using an RFID apparatus for access control and user identification.

FIG. 4 is a schematic flowchart diagram illustrating one embodiment of a method 400 for using an RFID apparatus 202 for access control and user identification. The method 400 begins and reads 402, using a first RFID sensor **102*a*, a first RFID tag 104 in close proximity to the first RFID sensor 102*a* indicating a closed status of a movable barrier 106 at an entry point of an enclosure 108. The enclosure 108 limits access to a machine 110 of an industrial operation. Opening of the movable barrier 106 allows entry to the enclosure 108 and the first RFID sensor 102*a* is in a housing 102 mounted at the entry point. The method 400 determines 404 if the first RFID tag 104 is close enough to read. If the method 400 determines 404 that the first RFID tag 104 is close enough to read, the method 400 returns and continues to attempt to read 402 the first RFID tag 104. If the method 400 determines 404 that the first RFID tag 104 is not close enough to read (e.g. the first RFID sensor 102*a* reads 402 the first RFID tag 104), the method 400 sends 406** an open alert.

While the method 400 is reading 402 the first RFID tag 104, the method 400 also attempts to read 408, using a second RFID sensor **102*b* located in the housing 102, a second RFID tag of an authorized person. The method 400 determines 410 if a second RFID tag is read. If the method 400 determines 410 that a second RFID tag is not read, the method 400 returns and continues to try to read 408 a second RFID tag. If the method 400 determines 410 that a second RFID tag is read, the method 400 sends 412 tag information from the second RFID tag and the method 400 ends. In various embodiments, the method 400 of FIG. 4 is implemented with one or more of the first RFID sensor 102*a* and the second RFID sensor 102*b* in the housing 102, the barrier access module 204 and the identification module 206**.

Figure 5:
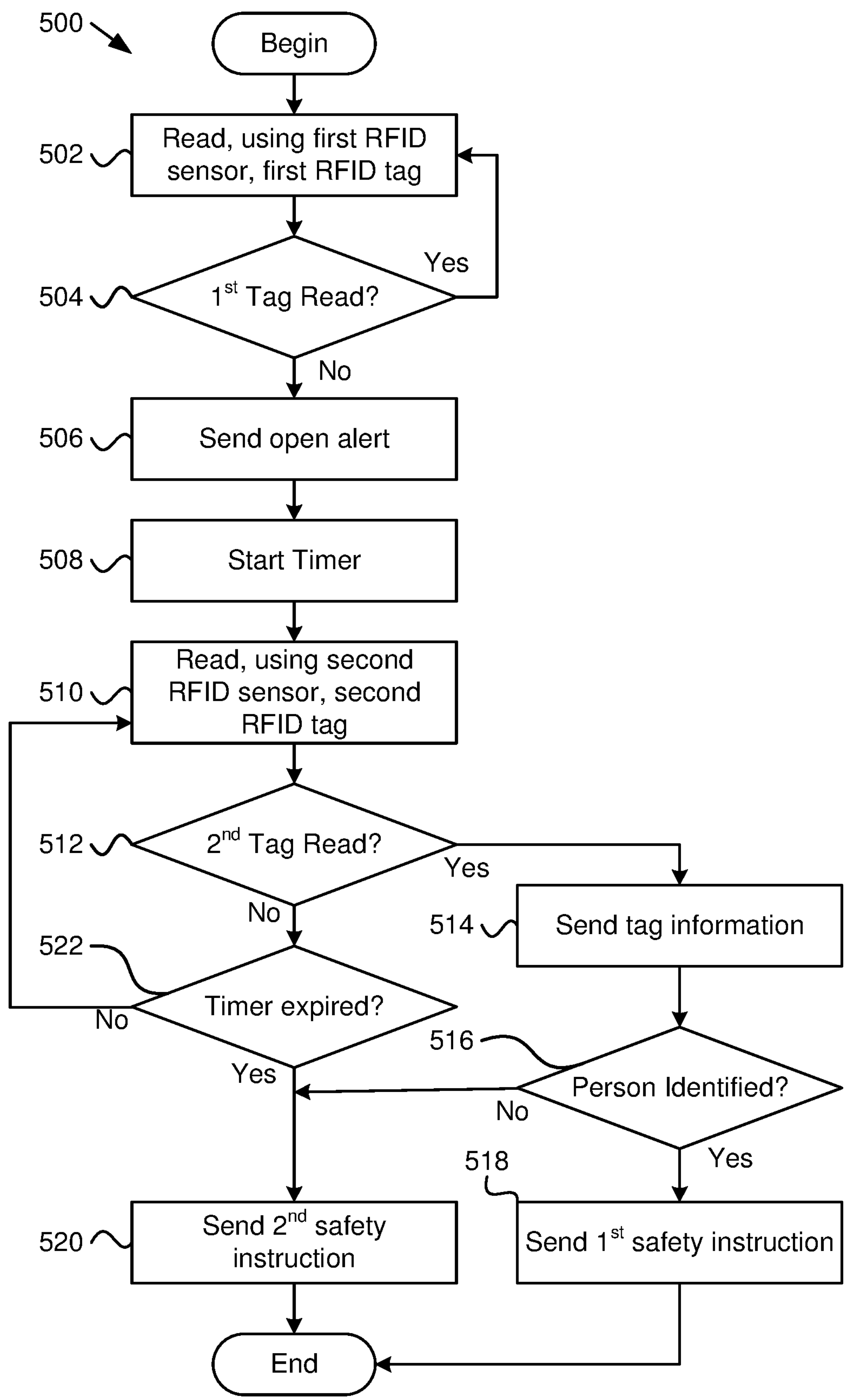
FIG. 5 is a schematic flowchart diagram illustrating another embodiment of a method for using an RFID apparatus for access control and user identification.

FIG. 5 is a schematic flowchart diagram illustrating another embodiment of a method 500 for using an RFID apparatus 202 for access control and user identification. The method 500 begins and reads 502, using a first RFID sensor **102*a*, a first RFID tag 104 in close proximity to the first RFID sensor 102*a* indicating a closed status of a movable barrier 106 at an entry point of an enclosure 108. The enclosure 108 limits access to a machine 110 of an industrial operation. Opening of the movable barrier 106 allows entry to the enclosure 108 and the first RFID sensor 102*a* is in a housing 102 mounted at the entry point. The method 500 determines 504 if the first RFID tag 104 is close enough to read. If the method 500 determines 504 that the first RFID tag 104 is close enough to read, the method 500 returns and continues to attempt to read 502 the first RFID tag 104**.

If the method 500 determines 504 that the first RFID tag 104 is not close enough to read (e.g. the first RFID sensor 102*a* reads 502 the first RFID tag 104), the method 500 sends 506 an open alert and starts 508 a timer and attempts to read 510, using a second RFID sensor 102*b* located in the housing 102, a second RFID tag of an authorized person, such as in and identification, badge, card, etc. of an authorized person. The method 500 determines 512 if a second RFID tag is read. If the method 500 determines 512 that a second RFID tag is read, the method 500 sends 514 tag information from the second RFID tag and determines 516 if the tag information belongs to an authorized person currently authorized to enter the enclosure 108. If the method 500 determines 516 that the tag information belongs to an authorized person currently authorized to enter the enclosure 108, the method 500 sends 518 a first safety instruction, and the method 500 ends. If the method 500 determines 516 that the tag information does not belong to an authorized person currently authorized to enter the enclosure 108, the method 500 sends 520 a second safety instruction, and the method 500 ends.

If the method 500 determines 512 that a second RFID tag has not been read, the method 500 determines 522 if the timer has expired. If the method 500 determines 522 that the timer has not expired, the method 500 returns and continues to attempt to read 510 a second RFID tag. If the method 500 determines 522 that the timer has expired, the method 500 sends 520 the second safety instruction, and the method 500 ends. Where there is an open alert and either a second RFID tag is not read within a timer limit or tag information from a second RFID tag does not correspond to an authorized person, the method 500 determines that an unauthorized person is entering the enclosure 108 and issues the second safety instruction. In various embodiments, one or more of the steps of the method 500 are implemented with one or more of the first RFID sensor 102*a* and the second RFID sensor 102*b* in the housing 102, the barrier access module 204, the identification module 206, the machine safety module 304 and the identity module 310.

Figure 6:
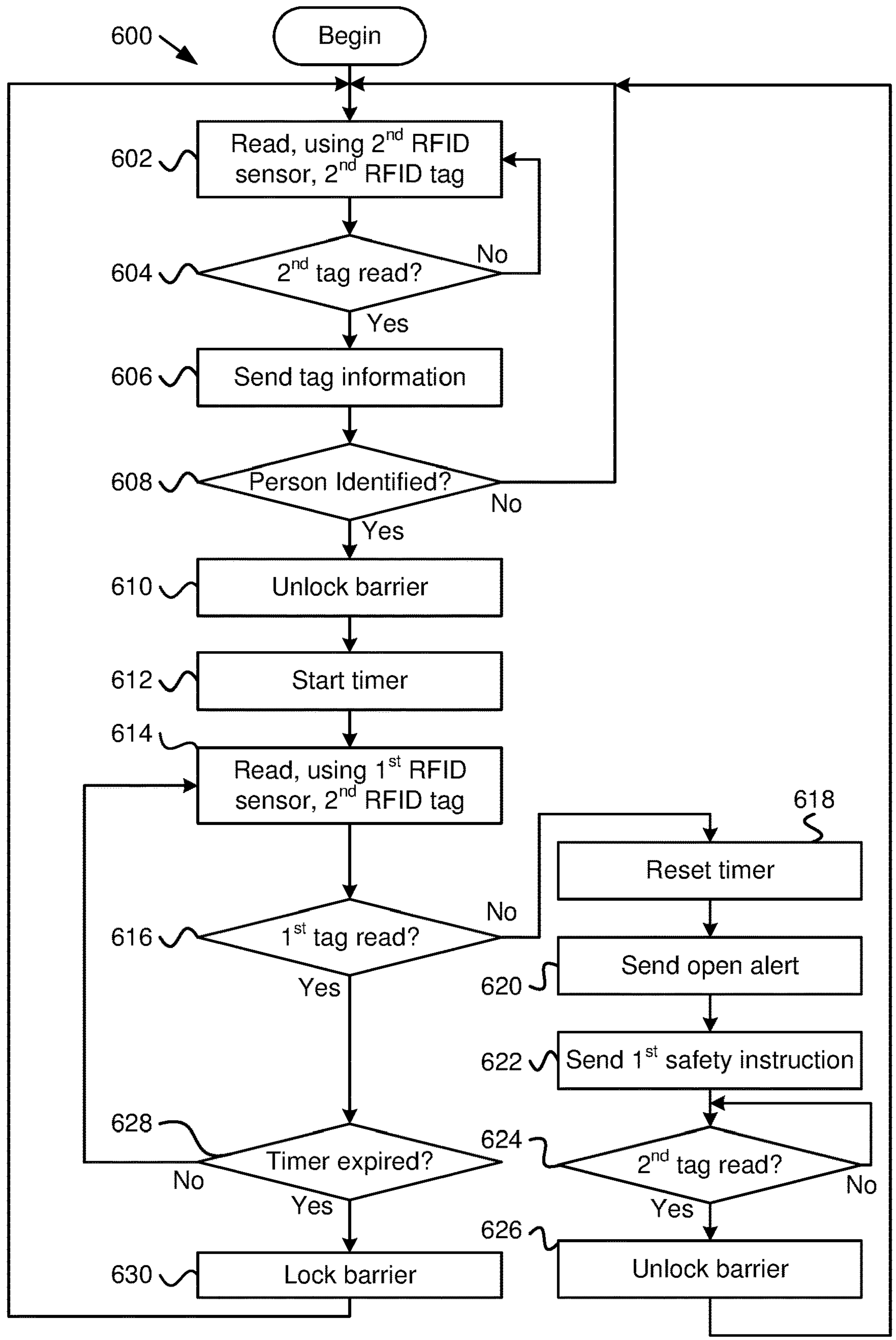
FIG. 6 is a schematic flowchart diagram illustrating another embodiment of a method for using an RFID apparatus for access control with a lock and user identification.

FIG. 6 is a schematic flowchart diagram illustrating another embodiment of a method 600 for using an RFID apparatus 202 for access control with a lock and user identification. The method 600 begins and attempts to read 602, using the second RFID sensor 102*b*, a second RFID tag of a person authorized to enter an enclosure 108 limiting access to a machine 110 of an industrial operation. The enclosure 108 has a movable barrier 106 for entry into the enclosure 108. The second RFID sensor 102*b* is within a housing 102. In some embodiments, the housing 102 is part of a locking switch. In other embodiments, the housing 102 is part of a non-contact switch and a separate locking switch locks the movable barrier 106.

The method 600 determines 604 if the second RFID sensor 102*b* has read a second RFID tag. If the method 600 determines 604 that the second RFID sensor 102*b* has not read a second RFID tag, the method 600 returns and attempts to read 602 a second RFID tag. If the method 600 determines 604 that the second RFID sensor 102*b* has read a second RFID tag, the method 600 sends 606 tag information from the second RFID tag to identify whether or not the tag information corresponds with an authorized person that is currently authorized to be in the enclosure 108. The method 600 determines 608 if an authorized person currently authorized to be in the enclosure 108 matches the tag information. If the method 600 determines 608 that the tag information does not match an authorized person, the method 600 returns and attempts to read 602 a second RFID tag.

If the method 600 determines 608 that the tag information matches an authorized person, the method 600 unlocks 610 the movable barrier 106, starts 612 a timer and attempts to read 614, using the first RFID sensor 102*a*, the first RFID tag 104. The method 600 determines 616 if the first RFID tag is close enough to be read. If the method 600 determines 616 the first RFID tag is not close enough to be read, signifying that the movable barrier 106 is open, the method 600 resets 618 the timer and sends 620 an open alert and sends 622 a first safety instruction. The first safety instruction is based an assumption that since the second RFID sensor 102*b* has read a second RFID tag that corresponds to an authorized person, the authorized person is trained with respect to safety in the enclosure 108.

The method 600 optionally determines 624 if the second RFID sensor 102*b* or other RFID sensor has read the second RFID tag a second time, indicative of the authorized person wanting to exit the enclosure 108. In other embodiments, the authorized person is able to leave the enclosure without swiping their identification with the second RFID tag. If the method 600 determines 624 that the second RFID sensor 102*b* or other RFID sensor has not read the second RFID tag a second time, the method 600 continues to determine 624 if the second RFID tag has been read, indicative of the authorized person not yet attempting to leave the enclosure 108. If the method 600 determines 624 that the second RFID sensor 102*b* or other RFID sensor has read the second RFID tag a second time, the method 600 optionally unlocks 626 the movable barrier 106 to allow the authorized person to leave the enclosure 108. In other embodiments, the authorized person is expected to swipe their identification upon exiting but other means are used to unlock the movable barrier 106, such as detection of motion at the enclosure side of the movable barrier 106, pressing a button, etc. The method 600 then returns and continues to attempt to read 602, using the second RFID sensor 102*b*, the second RFID tag.

If the method 600 determines 616 that the first RFID tag 104 is close enough to be read, signifying that the movable barrier 106 has not been opened, the method 600 determines 628 if the timer has expired. If the method 600 determines 628 that the timer has not expired, the method 600 returns and continues to attempt to read 614, using the first RFID sensor 102*a*, the first RFID tag 104. If the method 600 determines 628 that the timer has expired, the method 600 locks 630 the movable barrier 106 and returns and continues to attempt to read 602, using the second RFID sensor 102*b*, the second RFID tag. In various embodiments, one or more of the steps of the method 600 are implemented with one or more of the first RFID sensor 102*a* and the second RFID sensor 102*b* in the housing 102, the barrier access module 204, the identification module 206, the machine safety module 304, the exit module 306, the unlocking module 308, and the identity module 310.

Figure 7:
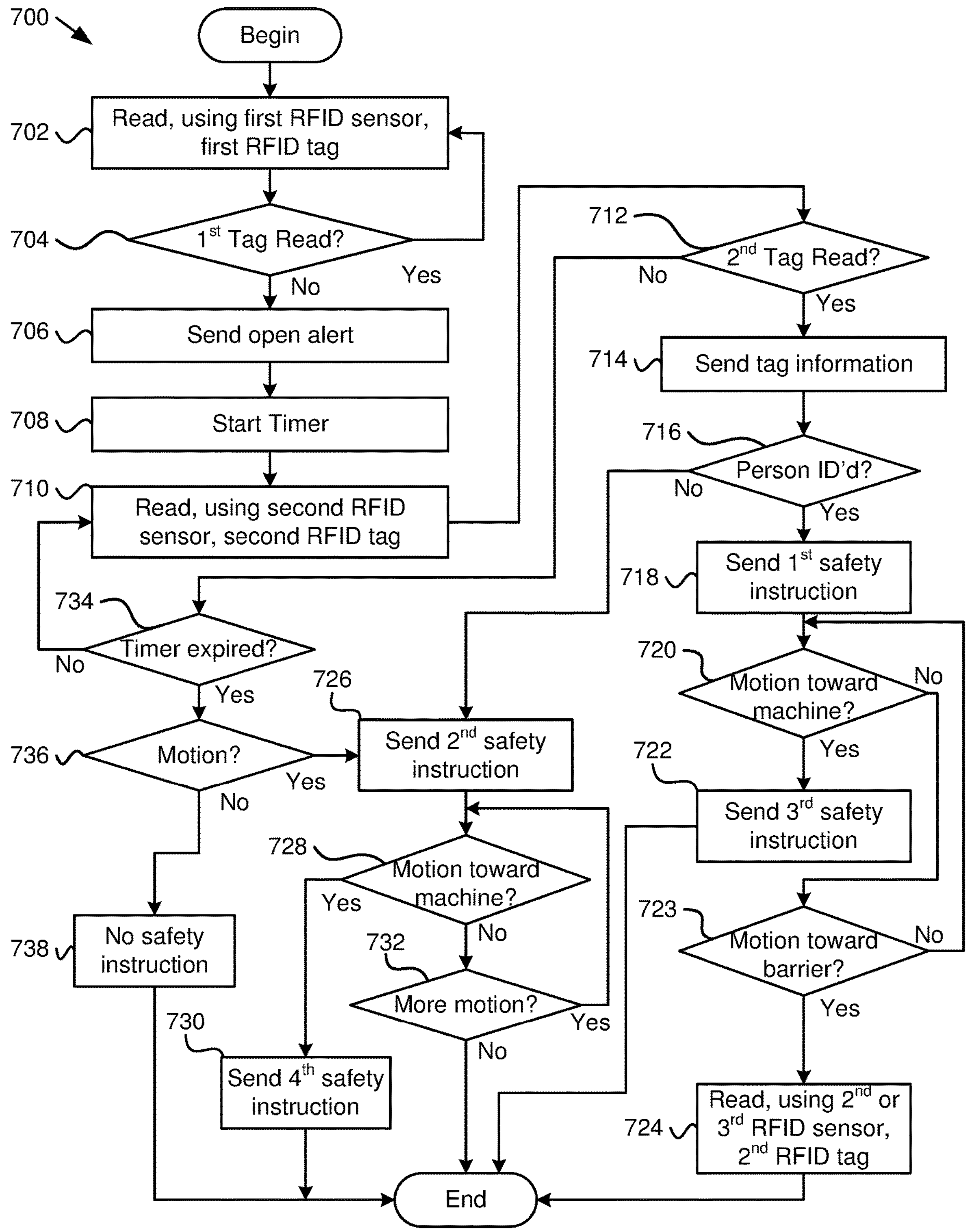
FIG. 7 is a schematic flowchart diagram illustrating another embodiment of a method for using an RFID apparatus for access control, user identification, and safety instructions under various circumstances.

FIG. 7 is a schematic flowchart diagram illustrating another embodiment of a method 700 for using an RFID apparatus 202 for access control, user identification, and safety instructions under various circumstances. The method 700 is applicable to an industrial operation with a machine 110 within an enclosure 108 with an entry point that includes a movable barrier 106 to gain access to the enclosure 108.

The enclosure 108 includes a housing 102 at a location where the movable barrier 106 is close to the enclosure 108 in a closed position. The method 700 begins and attempts to read 702, using the first RFID sensor 102*a*, the first RFID tag 104. The method 700 determines 704 if the first RFID tag 104 is close enough to be read. If the method 700 determines 704 that the first RFID tag 104 is close enough to be read, the method 700 returns and attempts to read 702 the first RFID tag 104.

If the method 700 determines 704 that the first RFID tag 104 is not close enough to be read, signifying that the movable barrier 106 is open, the method 700 sends an open alert 706 and starts 708 a timer. The method 700 attempts to read 710, using the second RFID sensor 102*b*, a second RFID tag and determines 712 if a second RFID tag has been read. For example, the method 700 may send the tag information from the housing 102 to an identity module 310, which may be in the safety apparatus 118 or in the housing 102. If the method 700 determines 712 that a second RFID tag has been read, the method 700 sends 714 tag information and determines 716 if the tag information corresponds to an authorized person that is authorized to be in the enclosure 108. For example, the method 700 may send 714 the tag information to a device that the method 700 uses to determine 716 if the tag information corresponds to an authorized person. If the method 700 determines 716 that the tag information corresponds to an authorized person that is authorized to be in the enclosure 108, the method 700 sends 718 a first safety instruction, signifying that there is an open alert and that tag information corresponds to an authorized person. The method 700 determines 720 if the motion sensor 114 senses motion toward the machine 110.

If the method 700 determines 720 that the motion sensor 114 does not sense motion toward the machine 110, the method 700 determines 723 if there is motion toward the movable barrier 106, indicative of the authorized person leaving. If the method 700 determines 723 that the motion sensor 114 has not detected motion toward the movable barrier 106, the method 700 returns and continues to determine 720 if there is motion toward the machine 110. If the method 700 determines 723 that there is motion toward the movable barrier 106, the method 700 reads 724, using the second RFID sensor 102*b* or the third RFID sensor 116 the second RFID tag of the authorized person, which indicates that the authorized person is leaving the enclosure 108, and the method 700 ends.

If the method 700 determines 720 that there is motion toward the machine 110, the method 700 sends 722 a third safety instruction, which takes action with regard to controlling the machine 110 assuming that an authorized person is approaching the machine 110, and the method 700 ends. If the method 700 determines 716 that 716 that the tag information does not correspond to an authorized person that is authorized to be in the enclosure 108, the method 700 sends 726 a second safety instruction, signifying an open alert and that tag information has not been sensed and/or that the tag information does not correspond to an authorized person. The method 700 determines 728 if the motion sensor 114 senses motion toward the machine 110, which with the second safety instruction is indicative of a non-authorized person moving toward the machine 110. If the method 700 determines 728 that there is motion toward the machine 110, the method 700 sends 730 a fourth safety instruction, and the method 700 ends. The fourth safety instruction, with the second safety instruction, is indicative of a non-authorized person moving toward the machine 110. The fourth safety instruction causes the machine 110 to stop or other action appropriate for a non-authorized person approaching the machine 110.

If the method 700 determines 728 that there is no motion toward the machine 110, the method 700 determines 732 if the motion sensor 114 senses additional motion. Motion is indicative of the non-authorized person still being within the enclosure 108. If the method 700 determines 732 that there is additional motion, the method 700 returns and continues to determine 728 if there is motion toward the machine 110. If the method 700 determines 732 that there is no additional motion, which is indicative of a person no longer being in the enclosure 108, the method 700 ends.

If the method 700 determines 712 that a second tag has not been read, the method 700 determines 734 if the timer has expired. If the method 700 determines 734 that the timer has not expired, the method 700 returns and continues to attempt to read a second RFID tag. If the method 700 determines 734 that the timer has expired, which is indicative of an open alert but no second RFID tag read within a time limit, the method 700 determines 736 if the motion sensor 114 senses motion in the enclosure 108. If the method 700 determines 736 that the motion sensor 114 has not detected motion in the enclosure 108, indicative of no person entering the enclosure, the method 700 does not send 738 a safety instruction, and the method 700 ends. If the method 700 determines 736 that the motion sensor 114 has detected motion in the enclosure 108, the method 700 sends 726 the second safety instruction and determines 728 if the motion sensor 114 detects motion toward the machine 110.

In the embodiments of FIGS. 4-7, the methods 400-700 sending the open alert, the first safety instruction and the second safety instruction may include sending the open alert, the first safety instruction and the second safety instruction to be used by the methods 400-700 for various purposes as describe above in addition to sending the open alert, the first safety instruction and the second safety instruction to other devices, to an operator, etc. In various embodiments, one or more of the steps of the method 700 are implemented with one or more of the first RFID sensor 102*a* and the second RFID sensor 102*b* in the housing 102, the barrier access module 204, the identification module 206, the machine safety module 304, the exit module 306, and the identity module 310.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component comprising:

a housing mounted at an entry point of an enclosure, the enclosure limiting access to a machine of an industrial operation;

a first radio frequency identification ("RFID") sensor, located in the housing, configured to read a first RFID tag in close proximity to the first RFID sensor indicating a closed status of a movable barrier at the entry point, wherein opening of the movable barrier allows entry to the enclosure, and wherein the first RFID tag is mounted on the movable barrier;

a second RFID sensor, located in the housing, configured to read a second RFID tag of an authorized person;

a barrier access module configured to send an open alert that the movable barrier is in an open state in response to the first RFID sensor not being close enough to read the first RFID tag; and an identification module configured to send tag information from the second RFID tag, wherein the tag information is unique to the authorized person;

a machine safety module configured to:

send a first safety instruction to the machine in response to, within an entry window of time, receiving the open alert, receiving the tag information and confirming that the tag information belongs to an authorized person currently authorized to enter the enclosure; and send a second safety instruction in response to, within the entry window of time, receiving the open alert and without receiving tag information or confirming that the tag information belongs to an authorized person currently authorized to enter the enclosure, wherein the first safety instruction differs from the second safety instruction and wherein the first safety instruction commands the machine according to an authorized person within the enclosure protocol and the second safety instruction commands the machine according to an unauthorized person within the enclosure protocol, wherein the authorized person within the enclosure protocol is less restrictive than the unauthorized person within the enclosure protocol in terms of actions to prevent injury, wherein at least a portion of the barrier access module, the identification module, and the machine safety module comprise one or more of hardware circuits, a programmable hardware device and program code, the program code stored on one or more non-transitory computer readable storage media.

2. The component of claim 1, further comprising a machine alert module configured to send a safety alert to the machine in response to the open alert.

3. The component of claim 1, further comprising a motion sensor configured to sense movement within the enclosure indicative of one or more people within the enclosure, wherein the machine safety module:

sends a third safety instruction to the machine in response to the first safety instruction and the sensed movement in the enclosure, the third safety instruction according to an authorized person within the enclosure protocol, and sends a fourth safety instruction to the machine in response to the second safety instruction and the sensed movement in the enclosure, the fourth safety instruction according to an unauthorized person within the enclosure protocol.

4. The component of claim 3, wherein in response to the motion sensor detecting more people within the enclosure than a number of authorized people for which tag information is received and for which the tag information is confirmed to belong to an authorized person currently authorized to be within the enclosure, the machine safety module sends the fourth safety instruction to the machine.

5. The component of claim 3, wherein the third safety instruction and the fourth safety instruction comprise one or more commands responsive to the motion sensor detecting movement, position and speed indicative of a person moving toward and reaching the machine, the one or more commands comprising action to prevent injury of a person in the enclosure.

6. The component of claim 3, wherein the motion sensor comprises a three-dimensional motion sensor positioned to detect position, direction of travel and speed of personnel in the enclosure.

7. The component of claim 3, further comprising an exit module configured to, in response to the motion sensor determining people within the enclosure have left the enclosure, send a notification that the enclosure does not have people in the enclosure.

8. The component of claim 1, further comprising an identity module configured to determine the identity of a person associated with the tag information and sending the identity of the person associated with the tag information.

9. The component of claim 1, further comprising an unlocking module configured to unlock the movable barrier in response to confirming that the tag information belongs to an authorized person currently authorized to enter the enclosure.

10. The component of claim 1, further comprising a third RFID sensor positioned to detect the second RFID tag approaching the movable barrier from the enclosure.

11. A method comprising:

reading, using a first radio frequency identification ("RFID") sensor, a first RFID tag in close proximity to the first RFID sensor indicating a closed status of a movable barrier at an entry point of an enclosure, the enclosure limiting access to a machine of an industrial operation, wherein opening of the movable barrier allows entry to the enclosure and wherein the first RFID sensor is in a housing mounted at the entry point, and wherein the first RFID tag is mounted on the movable barrier;

reading, using a second RFID sensor located in the housing, a second RFID tag of an authorized person;

sending an open alert that the movable barrier is in an open state in response to the first RFID sensor not being close enough to read the first RFID tag;

sending tag information from the second RFID tag, wherein the tag information is unique to the authorized person;

sending a safety alert to the machine in response to the open alert;

sending a first safety instruction to the machine in response to, within an entry window of time, receiving the open alert, receiving the tag information and confirming that the tag information belongs to an authorized person currently authorized to enter the enclosure; and sending a second safety instruction in response to, within the entry window of time, receiving the open alert and without receiving tag information or confirming that the tag information belongs to an authorized person currently authorized to enter the enclosure, wherein the first safety instruction commands the machine according to an authorized person within the enclosure protocol and the second safety instruction commands the machine according to an unauthorized person within the enclosure protocol, and wherein the authorized person within the enclosure protocol is less restrictive than the unauthorized person within the enclosure protocol in terms of actions to prevent injury.

12. The method of claim 11, further comprising determining the identity of a person associated with the tag information and sending the identity of the person associated with the tag information.

13. The method of claim 11, further comprising unlocking the movable barrier in response to confirming that the tag information belongs to an authorized person currently authorized to enter the enclosure.

14. The method of claim 11, further comprising:

sensing, using a motion sensor, movement within the enclosure indicative of one or more people in the enclosure;

sending a third safety instruction to the machine in response to the first safety instruction and the sensed movement in the enclosure, the third safety instruction according to an authorized person within the enclosure protocol; and sending a fourth safety instruction to the machine in response to the second safety instruction and the sensed movement in the enclosure, the fourth safety instruction according to an unauthorized person within the enclosure protocol.

15. The method of claim 14, further comprising, in response to the motion sensor determining people within the enclosure have left the enclosure, sending a notification that the enclosure does not have people in the enclosure.

16. A machine functional safety system comprising:

a housing mounted at an entry point of an enclosure, the enclosure limiting access to a machine of an industrial operation;

a first radio frequency identification ("RFID") tag mounted on movable barrier at the entry point, wherein the movable barrier prevents entry to the enclosure when in a closed position;

a first RFID sensor, located in the housing, configured to read the first RFID tag in close proximity to the first RFID sensor indicating a closed status of the movable barrier;

a second RFID sensor, located in the housing, configured to read a second RFID tag of an authorized person;

a barrier access module configured to send, to a safety relay, an open alert that the movable barrier is in an open state in response to the first RFID sensor not being close enough to read the first RFID tag, wherein the safety relay transmits a safety alert to controller for the machine in response to receiving the open alert, wherein the controller sends one or more commands to the machine in response to the safety alert;

an identification module configured to send, to the safety relay, tag information from the second RFID tag, wherein the tag information is unique to the authorized person, wherein the safety relay transmits the tag information and/or an identity of the authorized person; and a machine safety module configured to:

send a first safety instruction to the machine in response to, within an entry window of time, receiving the open alert, receiving the tag information and confirming that the tag information belongs to an authorized person currently authorized to enter the enclosure; and send a second safety instruction in response to, within the entry window of time, receiving the open alert and without receiving tag information or confirming that the tag information belongs to an authorized person currently authorized to enter the enclosure, wherein the first and second safety instructions control the machine to prevent injury, and wherein the first safety instruction differs from the second safety instruction, and wherein the first safety instruction commands the machine according to an authorized person within the enclosure protocol and the second safety instruction commands the machine according to an unauthorized person within the enclosure protocol, wherein the authorized person within the enclosure protocol is less restrictive than the unauthorized person within the enclosure protocol in terms of actions to prevent injury, wherein at least a portion of the barrier access module the identification module, and the machine safety module comprise one or more of hardware circuits, a programmable hardware device and program code, the program code stored on one or more non-transitory computer readable storage media.

* * * * *